Figure 3:
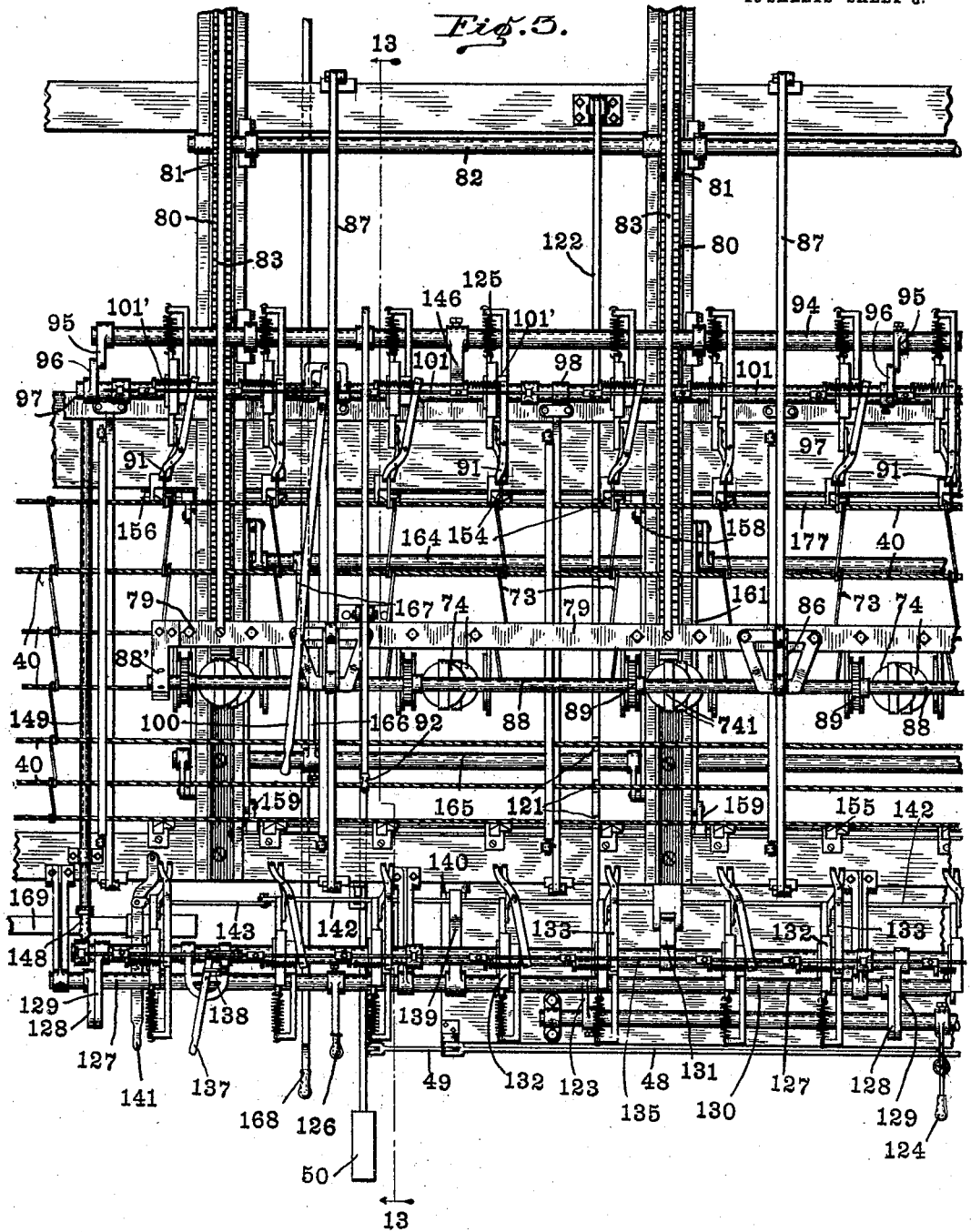

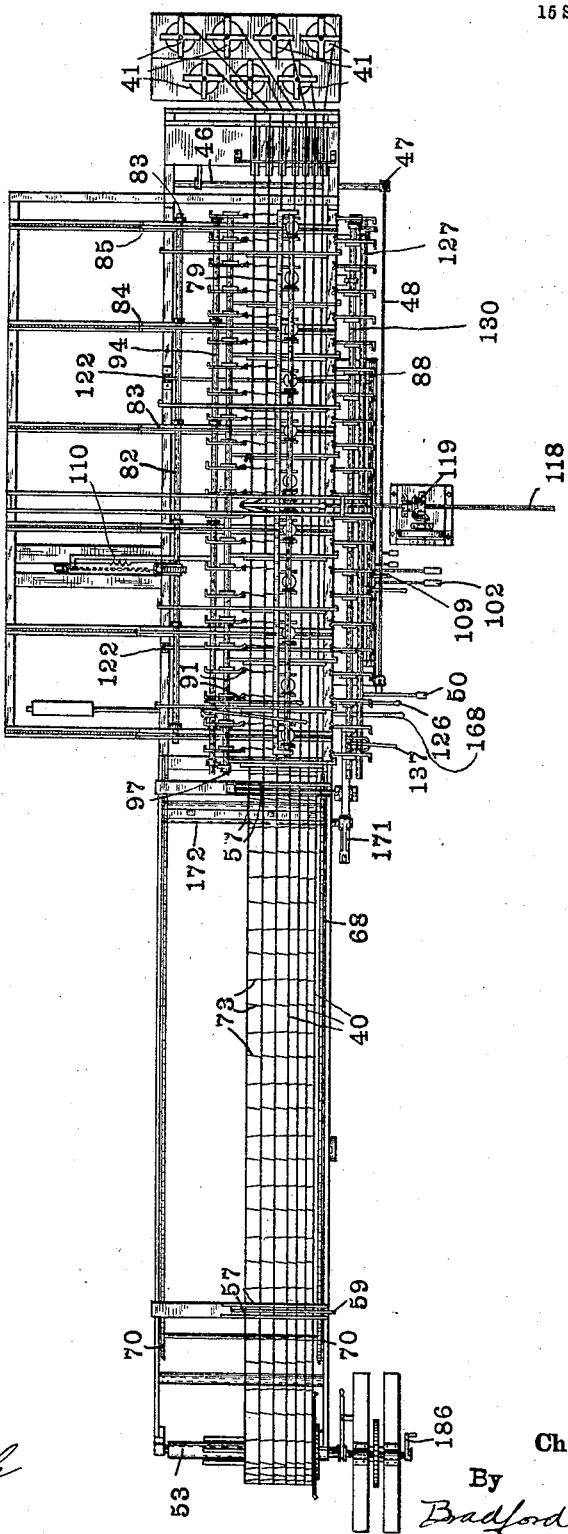

No. 773,321. PATENTED OCT. 25, 1904.
C. S. HENSLEY.
WIRE FENCE MACHINE.
APPLICATION FILED FEB. 12, 1904.
NO MODEL. 15 SHEETS—SHEET 2.
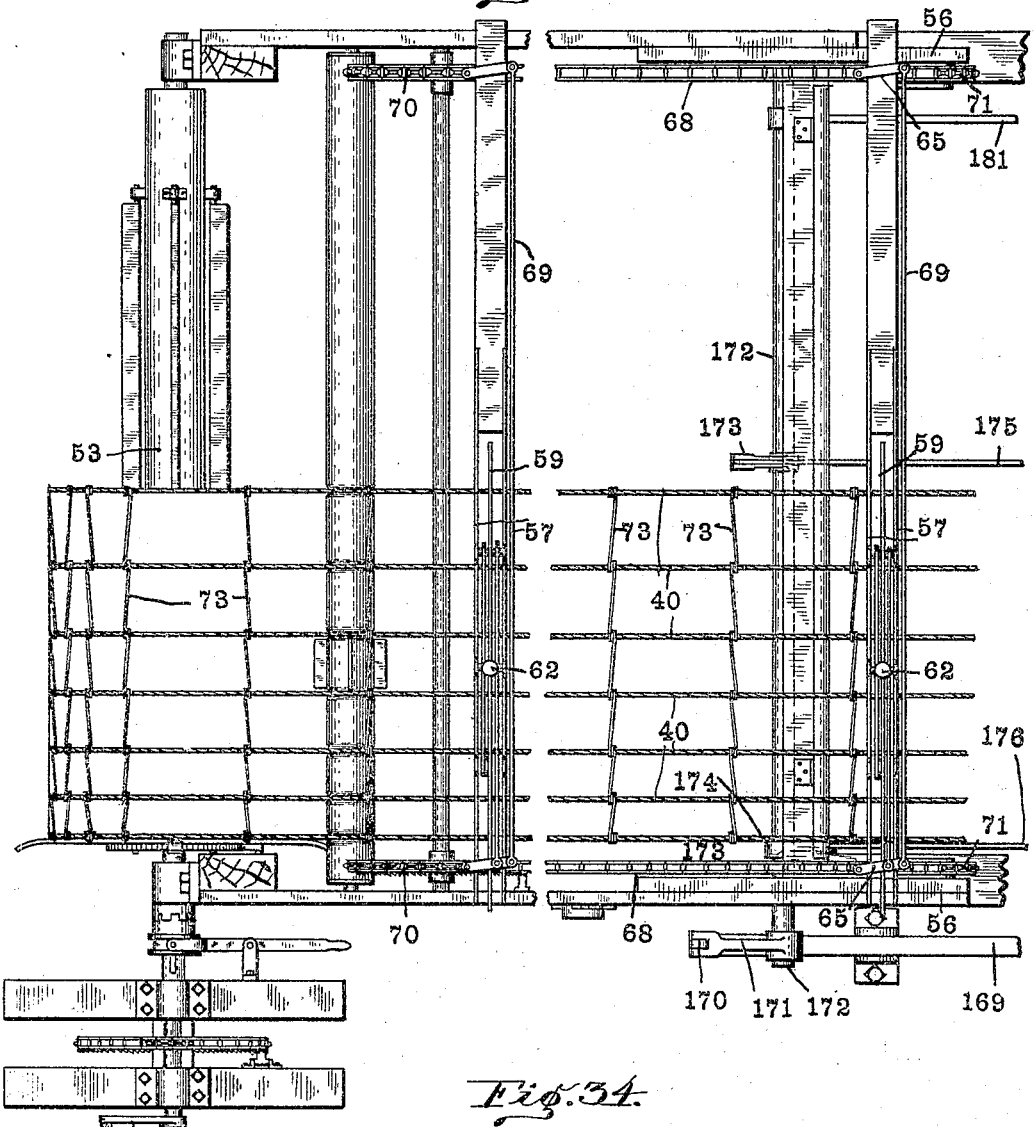
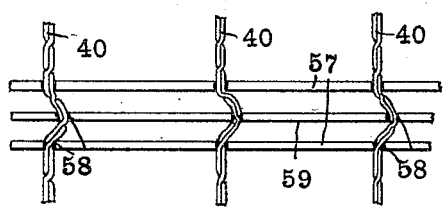
Witnesses
Inventor
Charles S. Hensley
By
Bradford Hood
Attorneys No. 773,321. PATENTED OCT. 25, 1904.
C. S. HENSLEY.
WIRE FENCE MACHINE.
APPLICATION FILED FEB. 12, 1904.
NO MODEL. 15 SHEETS—SHEET 3.

Witnesses
Frank A. Fahle
J. A. Walsh

Inventor
Charles S. Hensley
By
Bradford & Hood
Attorneys

No. 773,321. PATENTED OCT. 25, 1904.
C. S. HENSLEY.
WIRE FENCE MACHINE.
APPLICATION FILED FEB. 12, 1904.
NO MODEL. 15 SHEETS—SHEET 4.

Witnesses
Inventor
Charles S. Hensley
By
Bradford & Hood
Attorneys

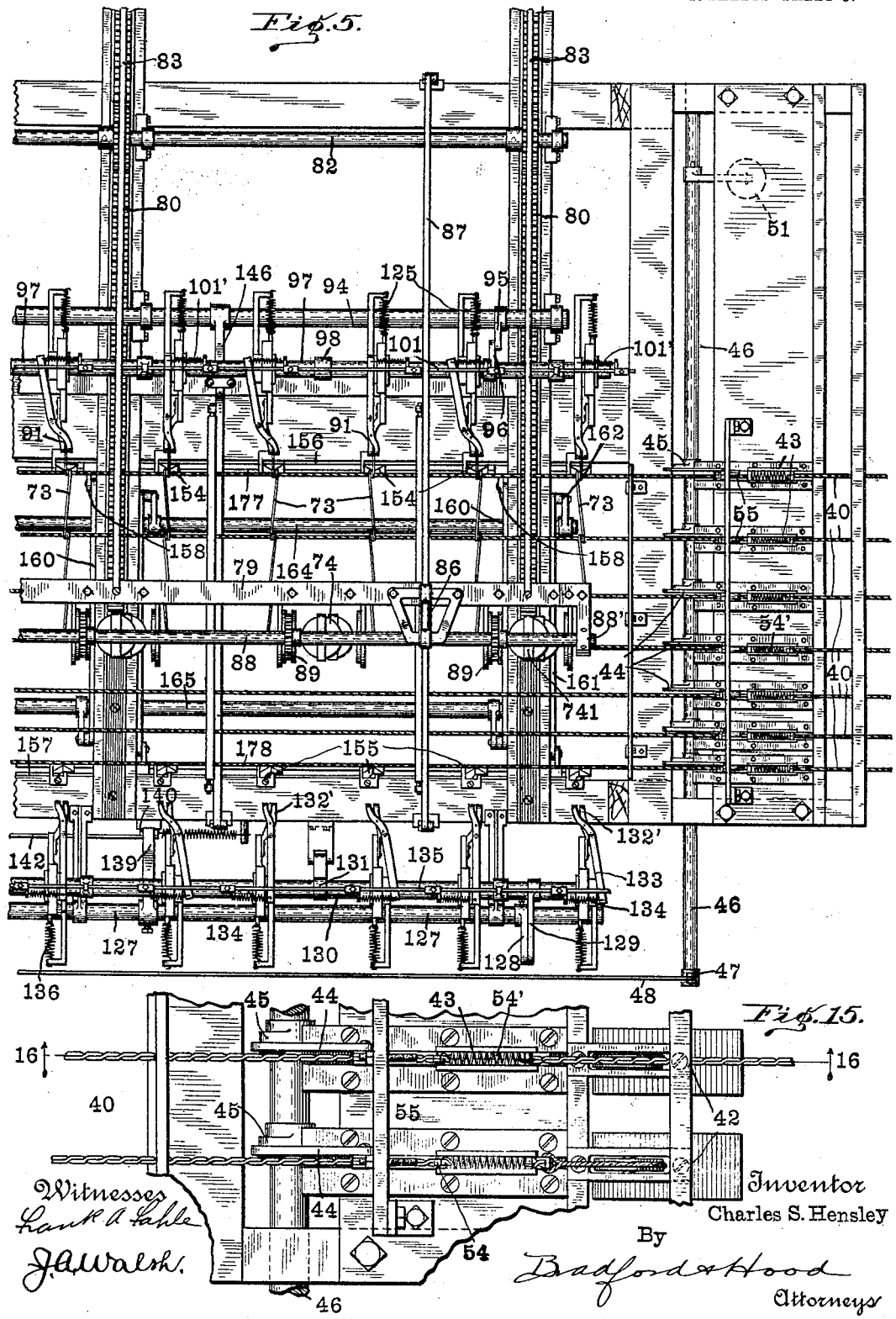

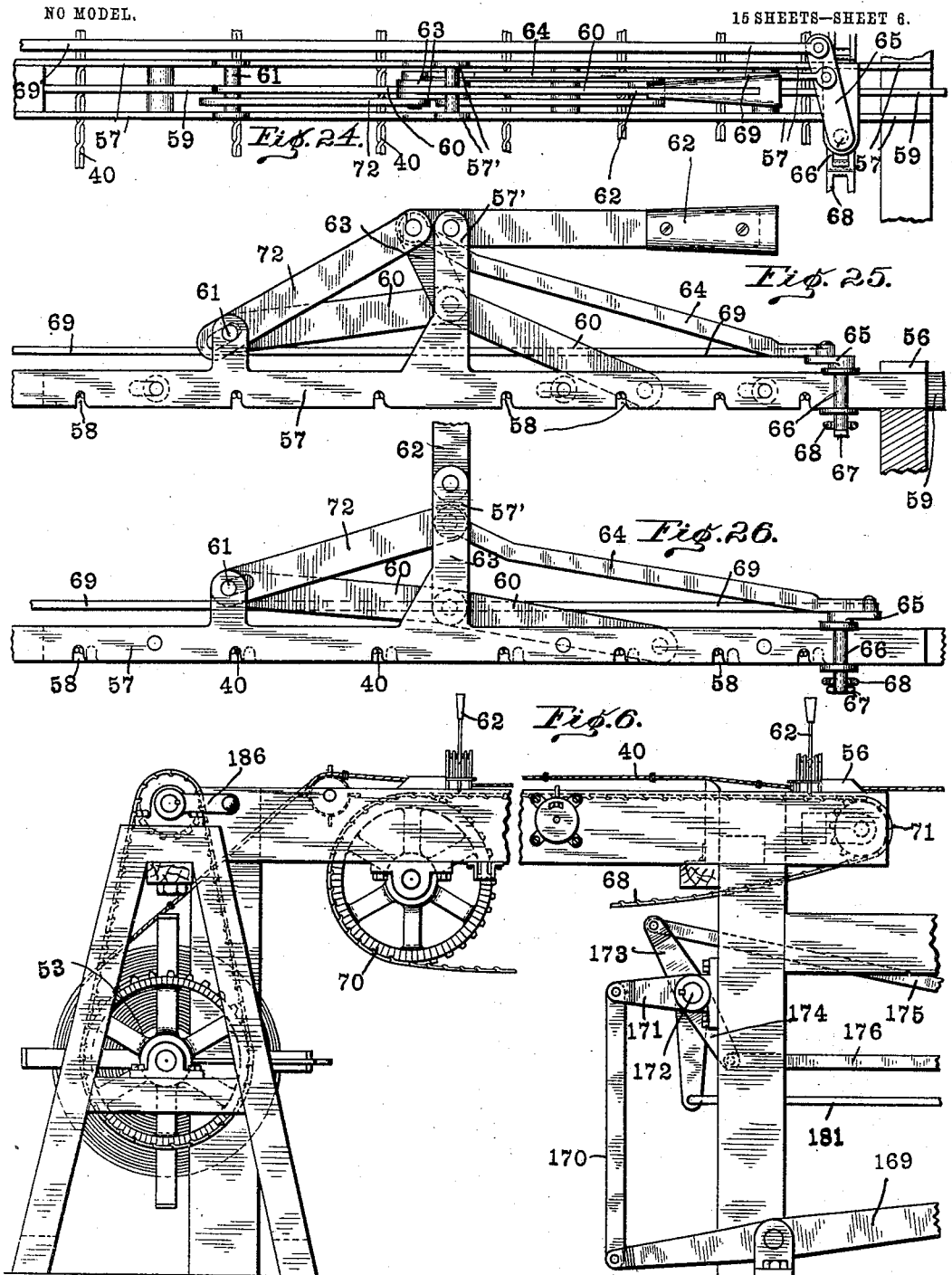

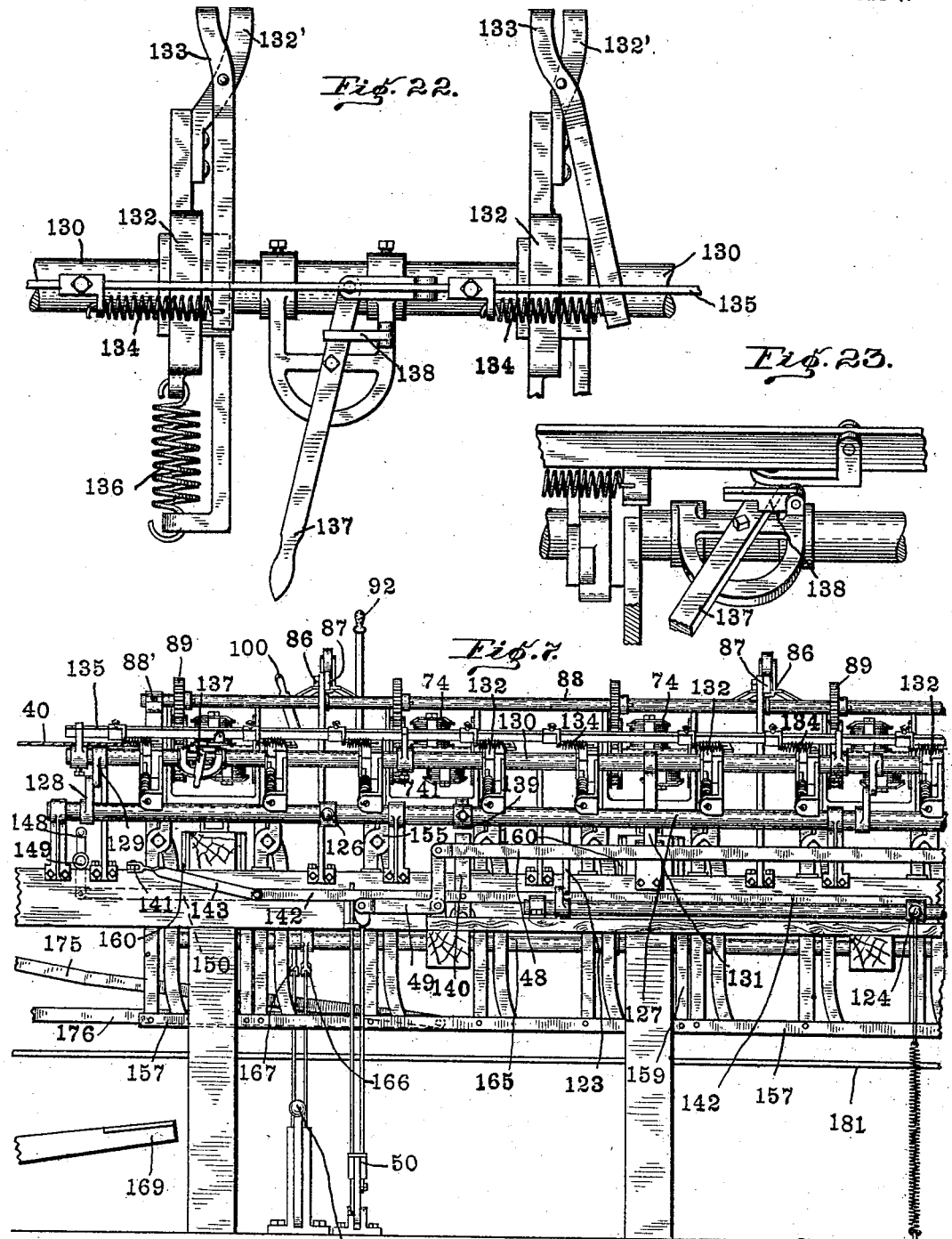

No. 773,321. PATENTED OCT. 25, 1904.
C. S. HENSLEY.
WIRE FENCE MACHINE.
APPLICATION FILED FEB. 12, 1904.
NO MODEL. 15 SHEETS—SHEET 8.
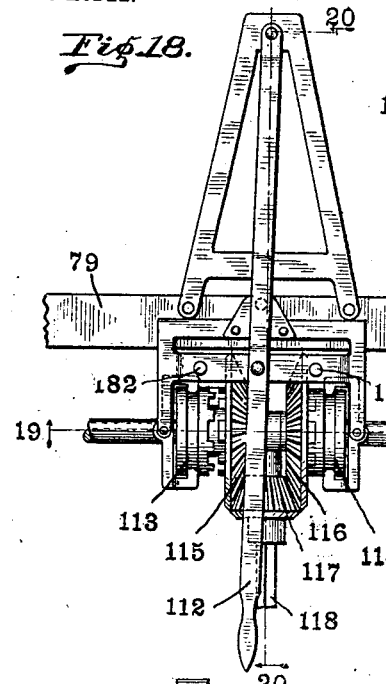
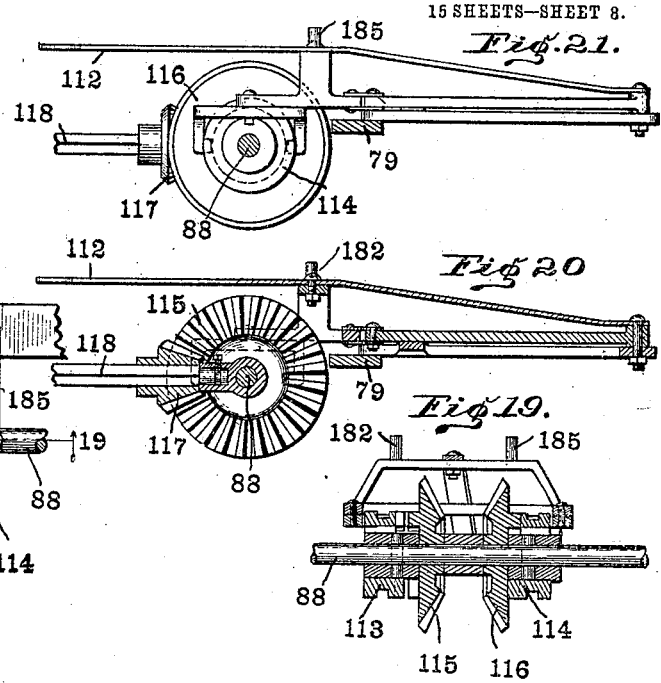
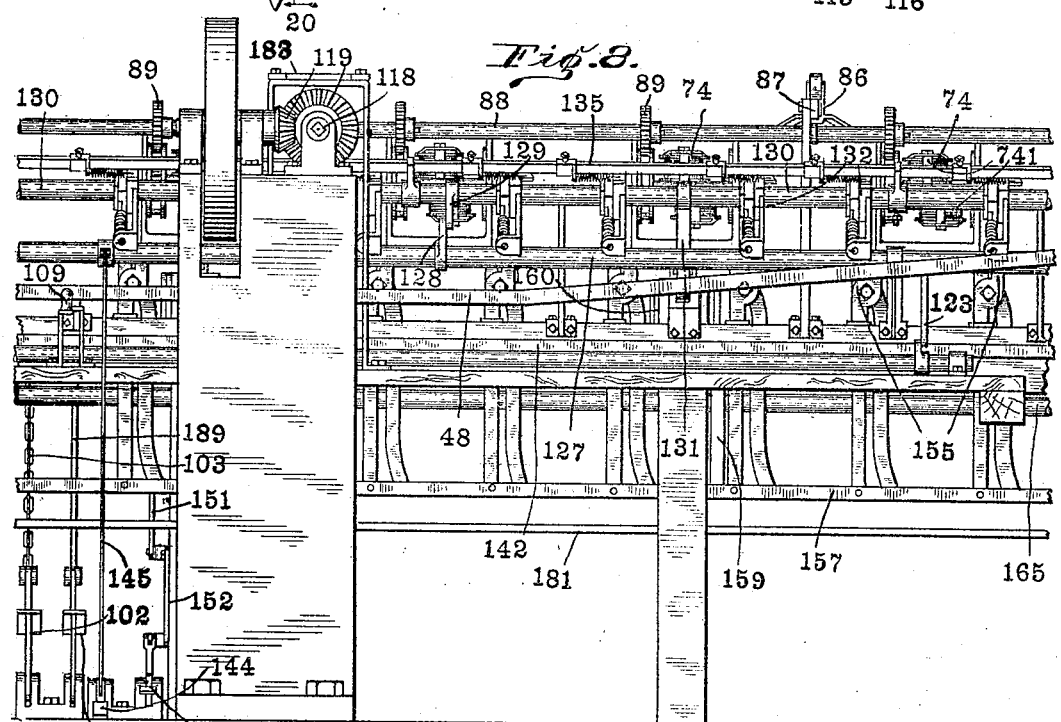
Witnesses
Inventor
Charles S. Hensley
By
Bradford & Hood
Attorneys No. 773,321. PATENTED OCT. 25, 1904.
C. S. HENSLEY.
WIRE FENCE MACHINE.
APPLICATION FILED FEB. 12, 1904.
NO MODEL. 15 SHEETS—SHEET 9.
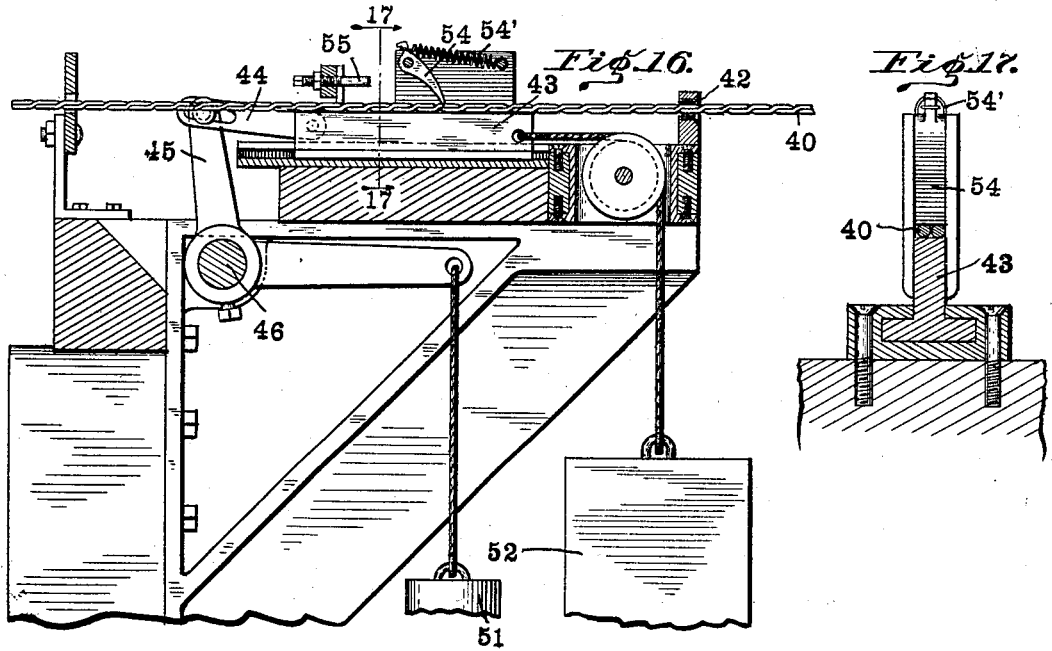
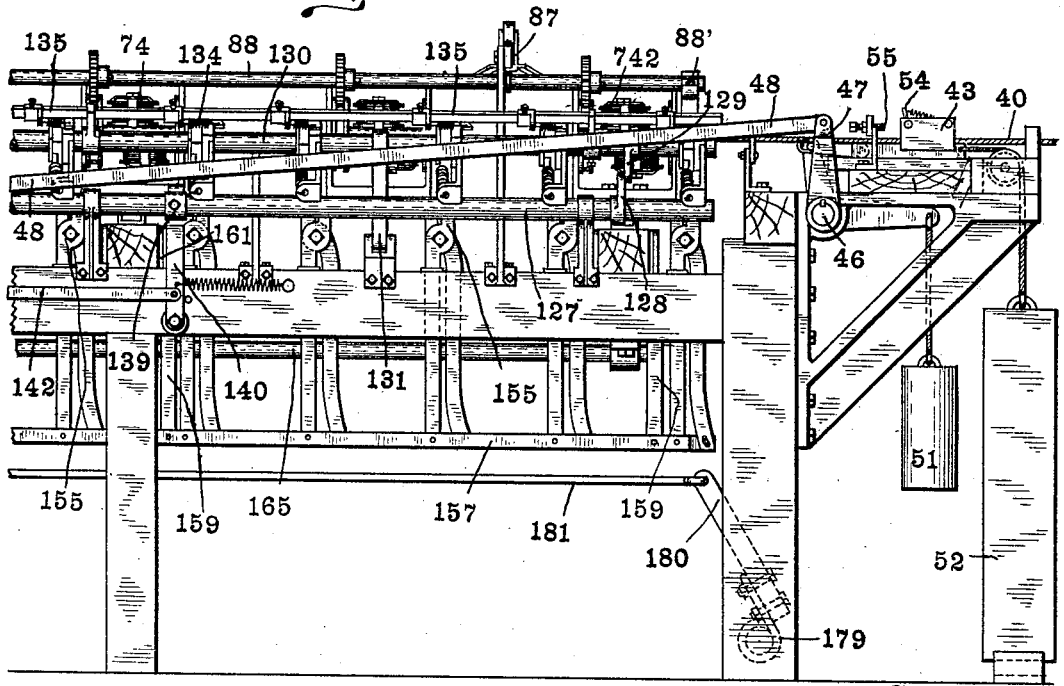
Witnesses
Frank A. Fahle
J. A. Walsh.
Inventor
Charles S. Hensley
By
Bradford & Hood
Attorneys

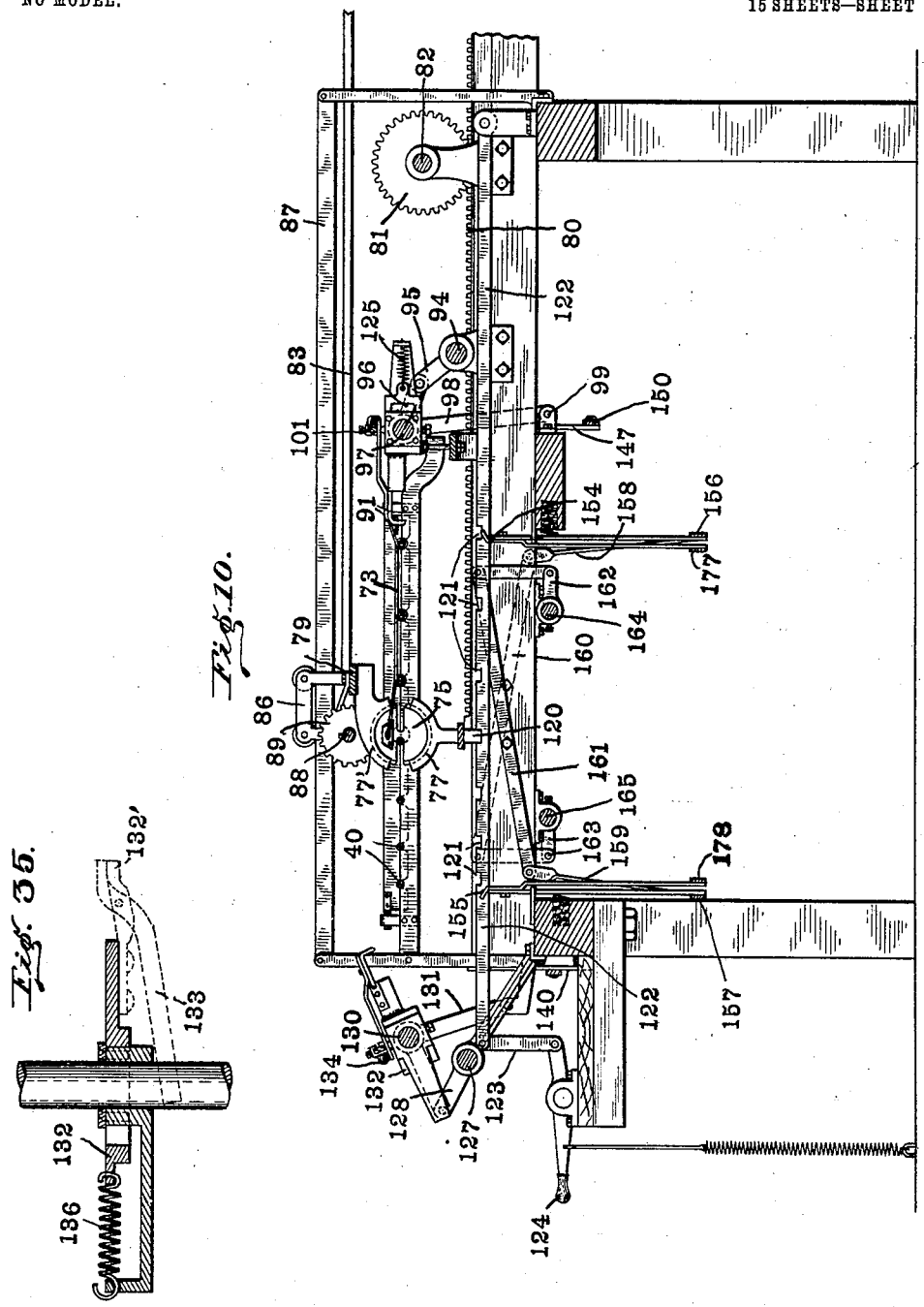

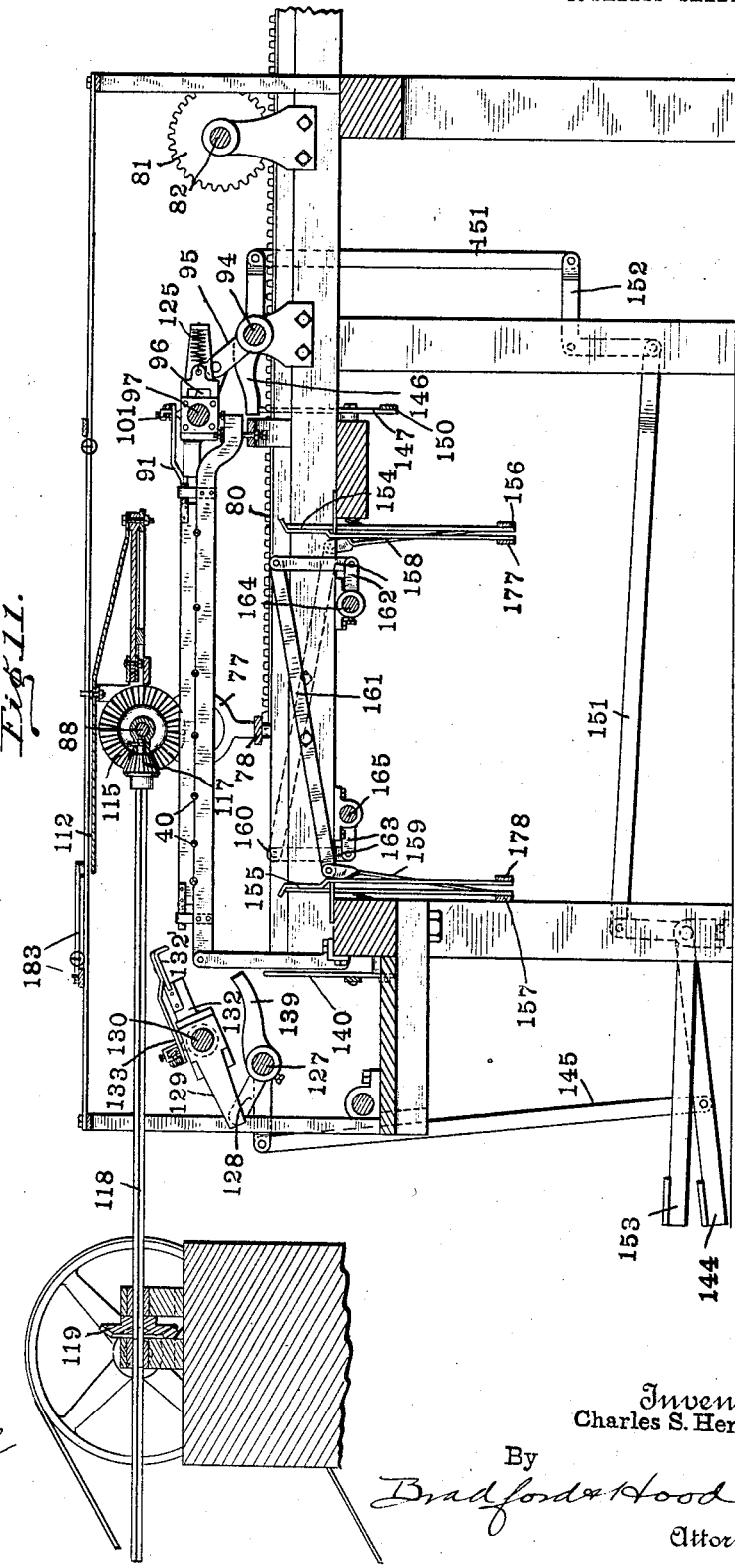

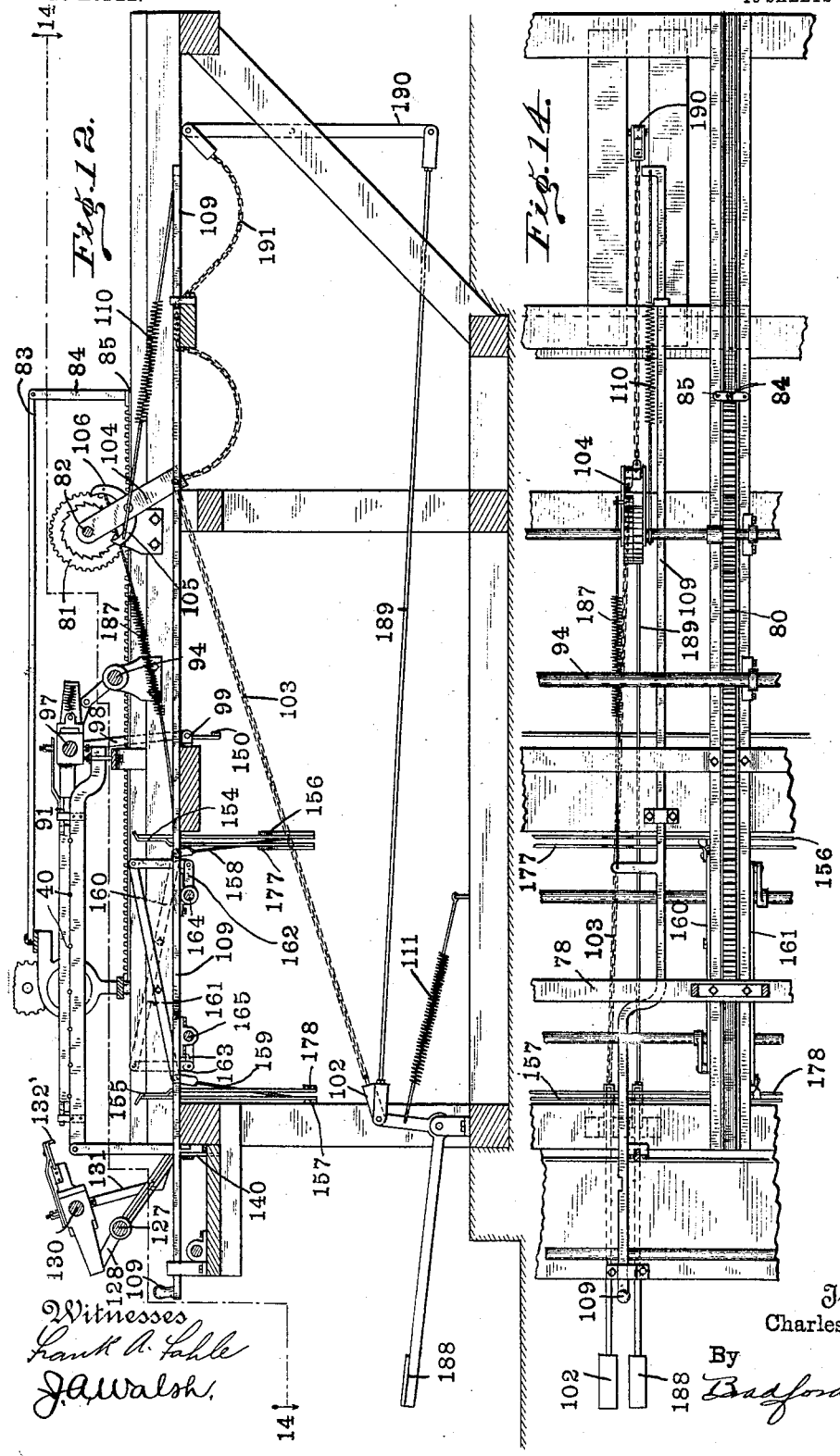

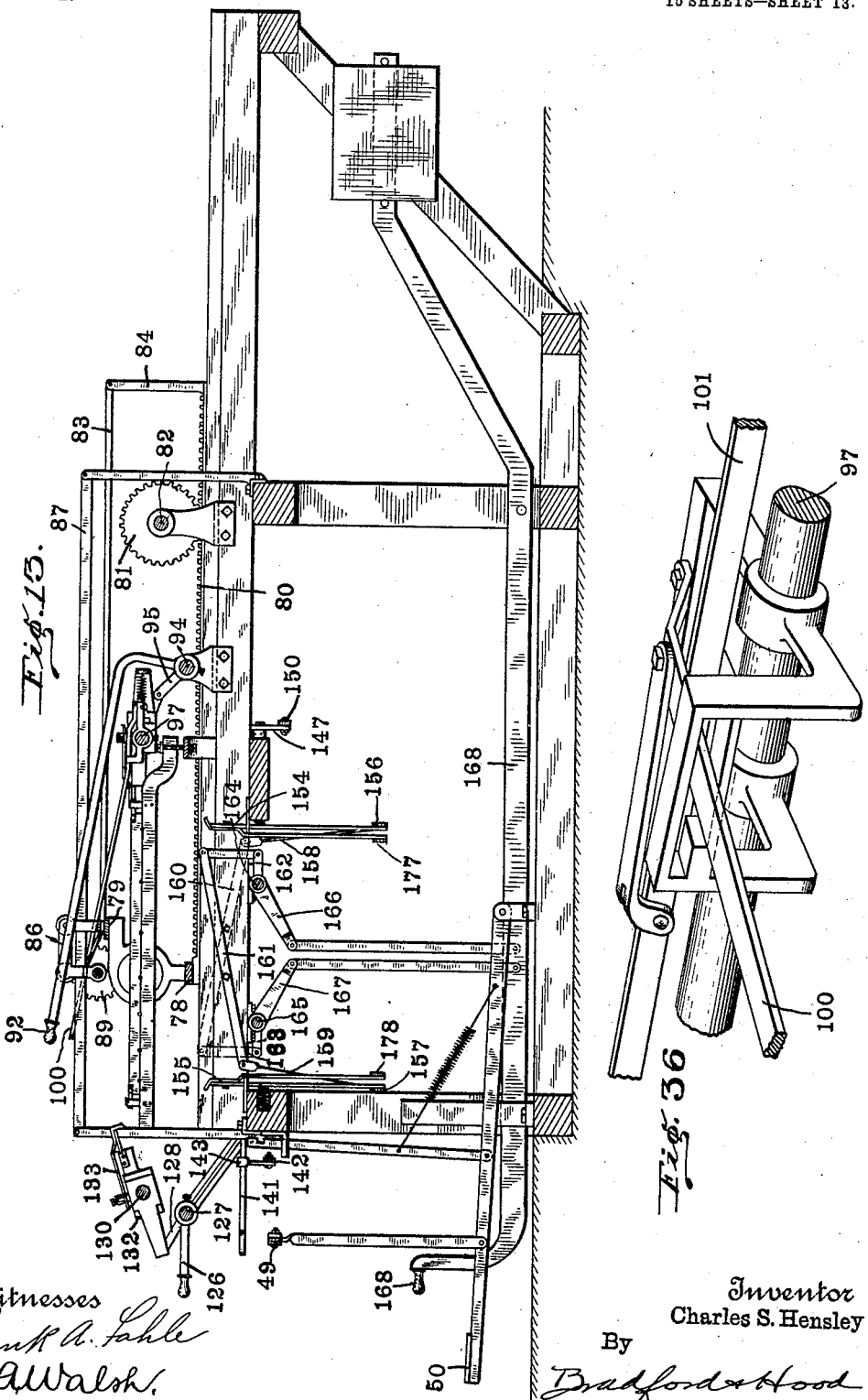

No. 773,321. PATENTED OCT. 25, 1904.
C. S. HENSLEY.
WIRE FENCE MACHINE.
APPLICATION FILED FEB. 12, 1904.
NO MODEL. 15 SHEETS—SHEET 14.
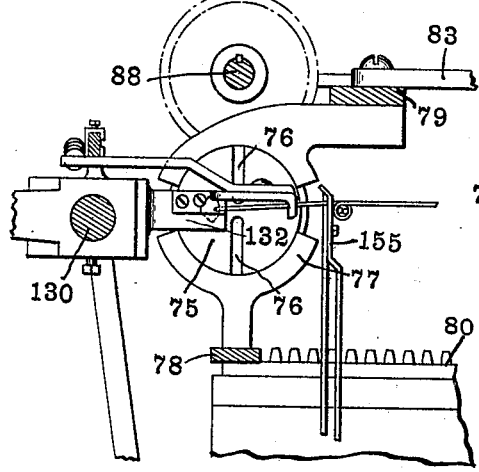
Fig. 27.'
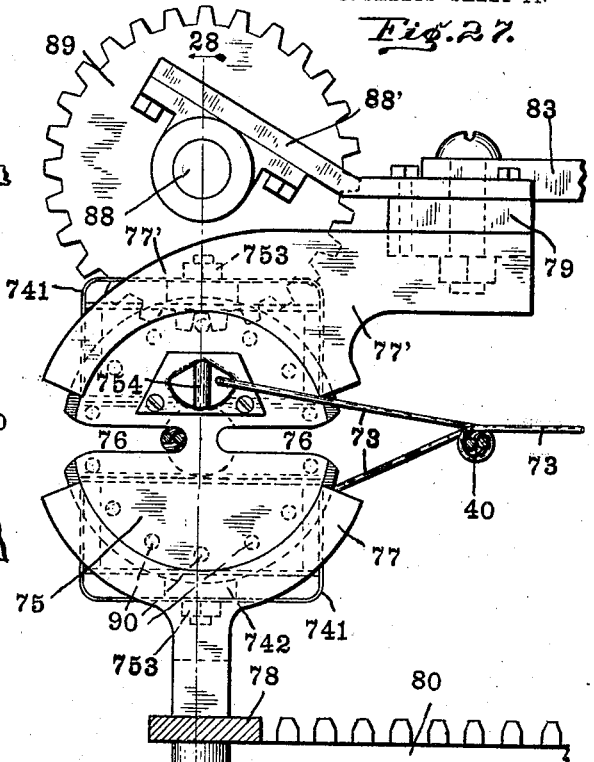
Fig. 27.
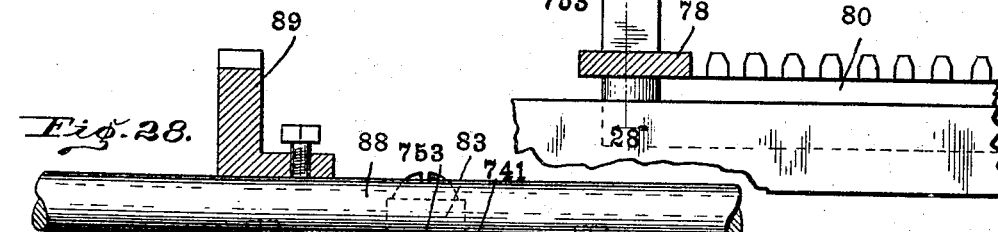
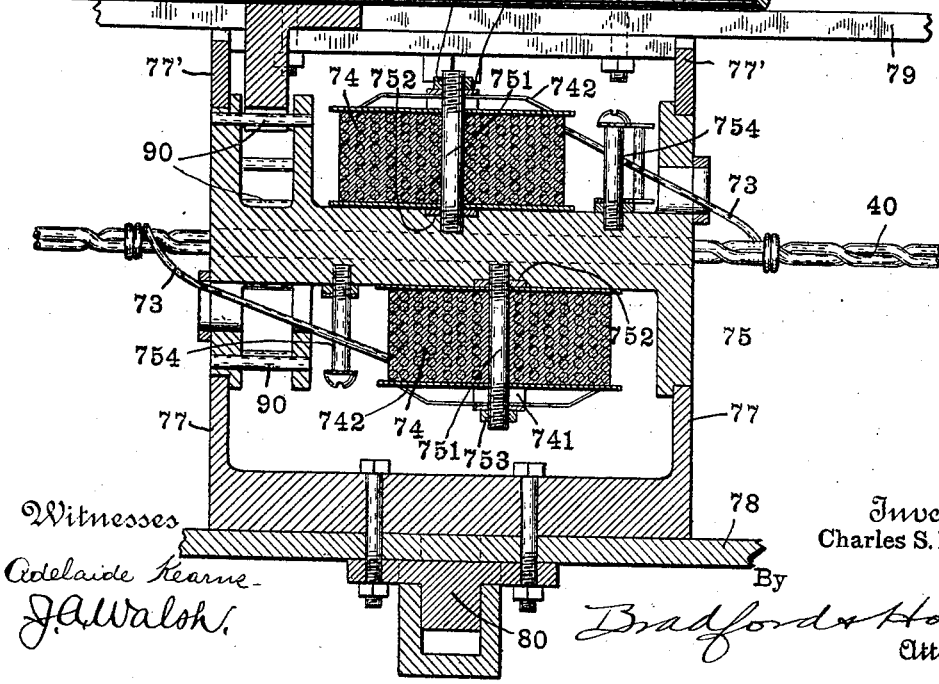
Fig. 28.
Witnesses
Adelaide Kearne
J. A. Walsh
Inventor
Charles S. Hensley
By Bradford & Hood
Attorneys No. 773,321. PATENTED OCT. 25, 1904.
C. S. HENSLEY.
WIRE FENCE MACHINE.
APPLICATION FILED FEB. 12, 1904.
NO MODEL. 15 SHEETS—SHEET 15.
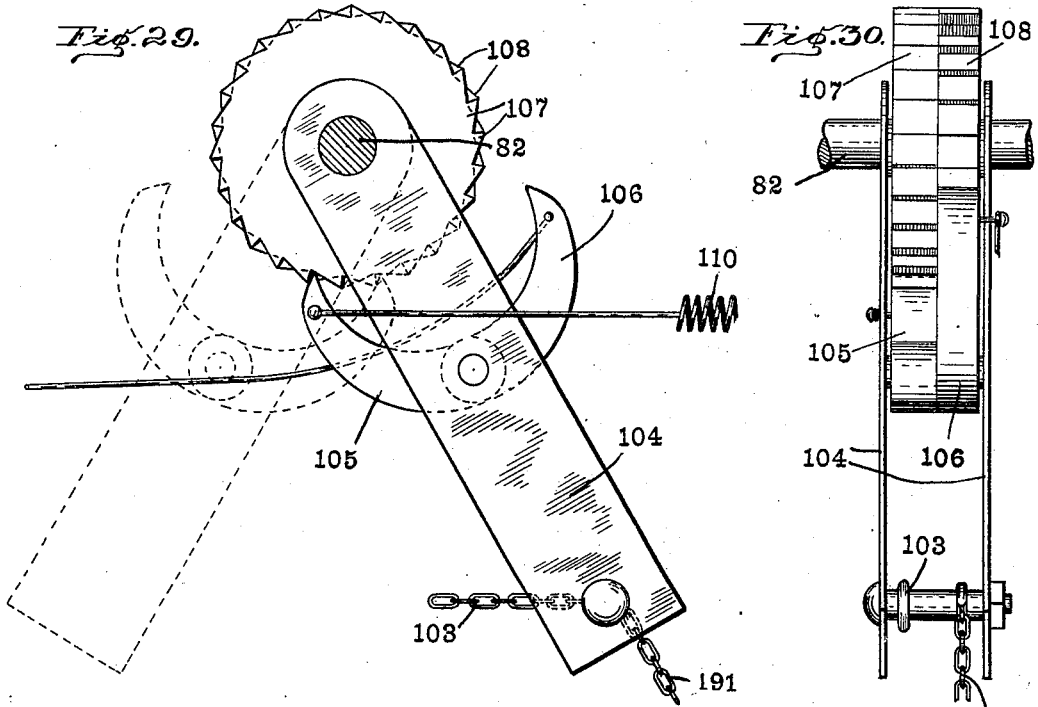
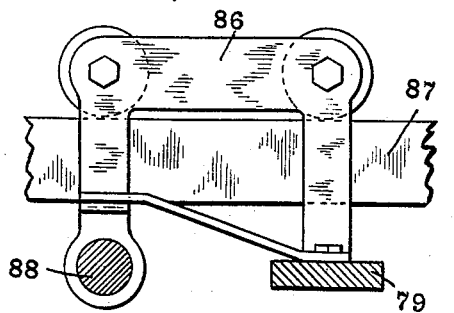
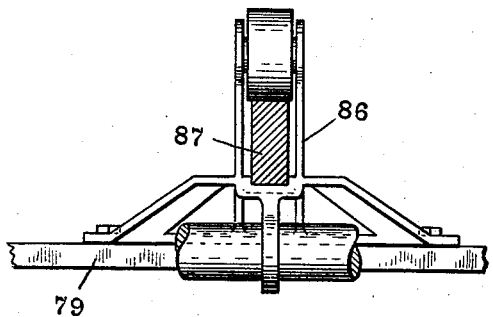
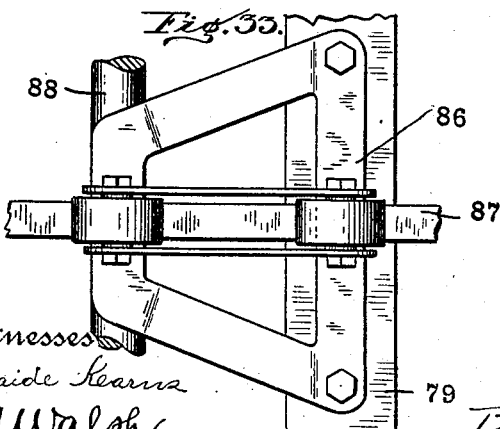
Witnesses
Adelaide Kearns
J. A. Walsh
Inventor
Charles S. Hensley
By Bradford Hood
Attorneys No. 773,321. Patented October 25, 1904.

UNITED STATES PATENT OFFICE.

CHARLES S. HENSLEY, OF ROACHDALE, INDIANA, ASSIGNOR TO HIMSELF, CORNELIUS L. AIRHART, JOSEPH A. AKERS, JAMES W. HYMER, GEORGE W. IRWIN, FRANK H. BOWEN, AND ISAAC E. WEDDLE, OF ROACHDALE, INDIANA, AND ELIJAH GRANTHAM, OF GREENCASTLE, INDIANA.

WIRE-FENCE MACHINE.

SPECIFICATION forming part of Letters Patent No. 773,321, dated October 25, 1904.

Application filed February 12, 1904. Serial No. 193,259. (No model.)

*To all whom it may concern:*

Be it known that I, CHARLES S. HENSLEY, a citizen of the United States, residing at Roachdale, in the county of Putnam and State of Indiana, have invented certain new and useful Improvements in Wire-Fence Machines, of which the following is a specification.

One of the principal types of wire fence is that known as the "square mesh," which consists of the desired length of running-wires connected by transverse stay-wires which are attached to the running-wires. One of the species of this type is that in which the stay-wires are themselves wrapped about the running-wires, and no other attaching means is necessary, and this species, like most of those of the type, is produced (generally) as a continuous fabric and is rolled into bundles of such size as is desired.

The object of my invention is to produce a machine capable of simultaneously attaching a large number of stay-wires to the running-wires, thus producing a considerable length of fabric at each operation.

The accompanying drawings illustrate a machine embodying my invention.

Figure 4:
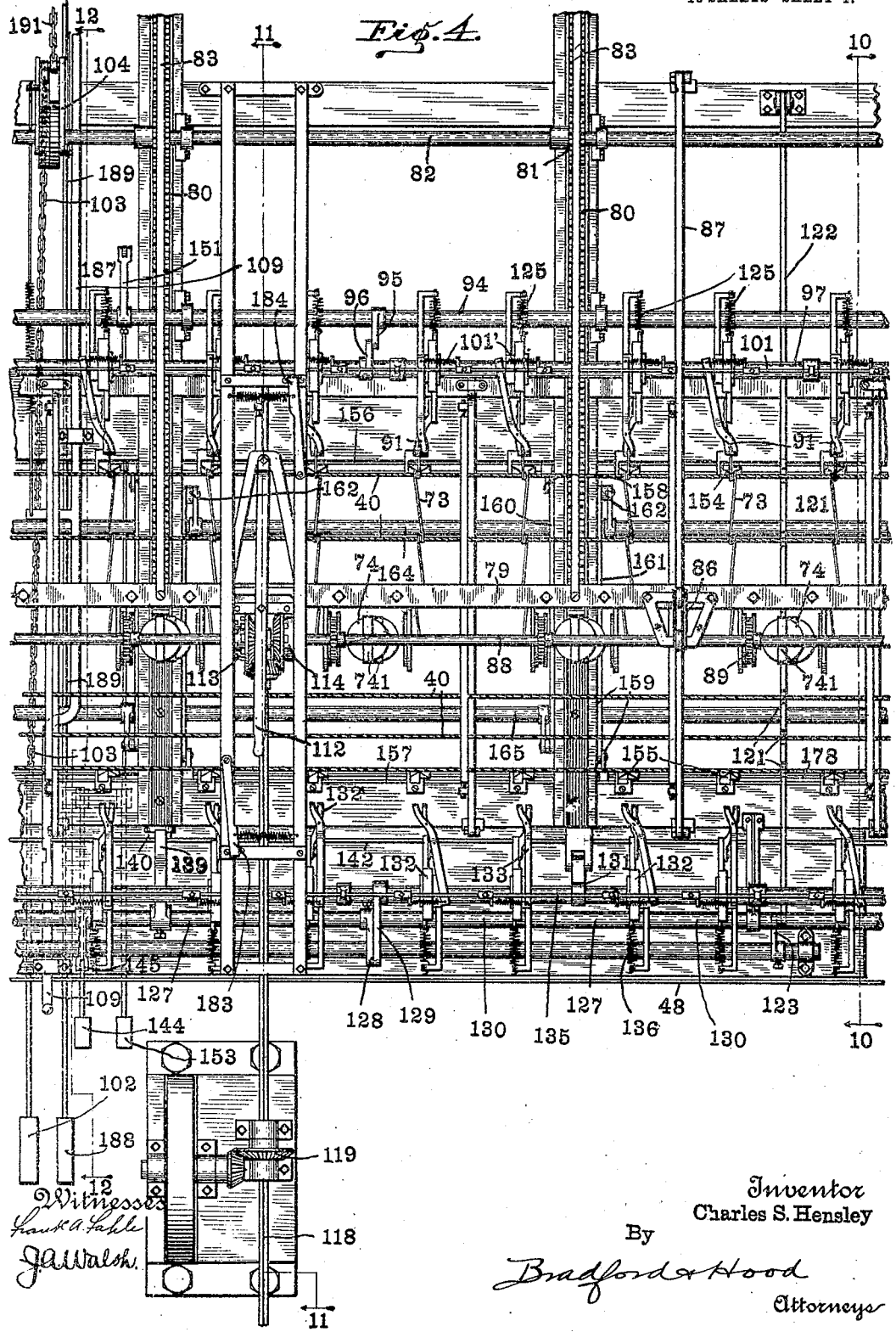

Figure 1 is a plan of the entire machine, showing the general arrangement of parts. Figs. 2, 3, 4, and 5 constitute a plan of the machine on a larger scale than that shown in Fig. 1, these figures being arranged in the order named from left to right and together forming a plan of the complete machine, a portion of the left-hand end being omitted, however, as indicated by broken lines of Fig. 2. Figs. 6, 7, 8, and 9 constitute a front elevation, said figures corresponding, respectively, to Figs. 2 to 5, inclusive. Fig. 10 is a section on line 10 10 of Fig. 4; Fig. 11, a section on line 11 11 of Fig. 4; Fig. 12, a section on line 12 12 of Fig. 4; Fig. 13, a section on line 13 13 of Fig. 3; Fig. 14, a horizontal section on line 14 14 of Fig. 12; Fig. 15, an enlarged plan of the tension mechanism; Fig. 16, a vertical section on line 16 16 of Fig. 15; Fig. 17, a vertical section on line 17 17 of Fig. 16; Fig. 18, an enlarged plan of the reversing-gearing; Fig. 19, a section on line 19 19 of Fig. 18; Fig. 20, a section on line 20 20 of Fig. 18; Fig. 21, a side elevation of the parts shown in Fig. 18; Fig. 22, an enlarged detail plan of a pair of stay-wire grippers; Fig. 23, a perspective detail of parts shown in Fig. 22; Fig. 24, a plan of the running-wire gripper and feeder; Fig. 25, a side elevation thereof with the parts shown in receiving position; Fig. 26, a similar view with the parts in holding position; Fig. 27, a side elevation, on an enlarged scale, of one set of stay-wire bobbins and wrapping mechanism. Fig. 27' is a detail on a slightly-enlarged scale, supposing the bobbin to have been moved as far as possible to the left in Fig. 10, the stay-wire gripper to have been brought into engagement with the stay-wire, and the shear 155 projected upward into position to engage the stay-wire; Fig. 28, a section on line 28 28 of Fig. 27; Fig. 29, a side elevation of the means for advancing the stay-wire-bobbin carrier; Fig. 30, an end elevation of the parts shown in Fig. 29; Figs. 31, 32, and 33, details of one of the upper supports for the stay-wire-bobbin carrier; Fig. 34, a detail of the running-wire gripper. Fig. 35 is a detail of the sliding or yielding support for one of the stay-wire grippers, and Fig. 36 is a perspective detail of the operating-bar for the rear set of stay-wire grippers.

The running-wires 40 are carried from supply-spools 41 through eyes 42, Figs. 15 and 16, and over a sliding carriage 43. This carriage is connected by a link 44 with an arm 45, secured to a rock-shaft 46. Shaft 46 is provided with as many arms 45 as there are slides 43, one of said slides being provided for each running-wire. Said shaft is also provided with an arm 47, Fig. 9, which is connected by a link 48 and bell-crank lever 49 with a foot-treadle 50, arranged at a convenient point near the middle of the machine, the arrangement being such that the operator by stepping upon lever 50 will draw the carriages 43 to the left, Fig. 16, in opposition to the tension-weights 51 and 52, which are connected to the shaft 46 and carriages 43, respectively.

The running-wires are carried over the slides 43 and from thence to a suitable winding-drum 53, and the slides 43 are moved to the left, as described, until the pawls 54 of said carriages are engaged by stationary pins 55, which serve to raise the pawls from the path of the running-wires. As soon as the running-wires have been attached to the winding-drum the feeding-gripper (illustrated in Figs. 25 and 26) is laid across the main frame of the machine against stops 56. This gripper consists of a pair of parallel bars 57, provided upon their under edges with as many slots 58 as there are running-wires. Arranged between the two bars 57 is a similarly-slotted bar 59. Bar 59 is moved by a toggle 60, one end of which is attached to the bar and the other to a stationary pin 61, carried by the bars 57. Pivoted to arms 57', carried by the bars 57, is a lever 62, which is connected by a link 63 with the center of toggle 60, so that by swinging lever 62 bar 59 is shifted longitudinally with relation to the bars 57, so as to produce a kink in the running-wires, as clearly shown in Fig. 34. This kink serves to retain the gripper upon the running-wires, and the gripper is then held by the blocks 56. At the same time lever 62 operates through a link 64 upon a lever 65. This lever carries a vertical pin 66, which is provided with a T-head 67 at its lower end, which head and pin passes through a feed-chain 68. Lever 65 is connected by a link 69 with a similar head and pin at the opposite end of the gripper, which similarly passes through the second chain 68, these two chains passing over suitable idler-pulleys 70 and 71. The operation of the T-head 67 beneath the chain 68 is thus automatic, and lever 62 is prevented from swinging beyond center, as shown in Fig. 26, by means of a slotted link 72. As soon as the gripper just described has been attached to the running-wires and lies against blocks 56 the operator releases foot-lever 50, and thus permits the weights 51 and 52 to draw slides 43 to the right, Fig. 16, the pawls 54 being thus released so as to be swung by springs 54' down into engagement each with its running-wire, thus permitting the weights to act upon the running-wires and stretching them with the desired tension. Slight variation in the amount of slack in the running-wires is compensated by the slotted connection between link 44 and lever 45.

The stay-wires 73 are carried by bobbins 74, said bobbins being carried in pairs by a rotatable bobbin-holder 75, which is provided at each end with a circular head having formed therein a pair of diametrically-opposing radial slots 76, which extend nearly to the center. Each bobbin-holder is supported in a pair of nearly semi-annular heads 77 and 77', heads 77 being carried by a lower cross-bar 78 and heads 77' being carried by an upper cross-bar 79. The cross-bar 78 is secured to the forward ends of a series of rack-bars 80, into which mesh suitable gears 81, carried by a shaft 82. The upper cross-bar 79 is secured to the forward ends of bars 83, which at their rear ends are supported upon standards 84, erected from a cross-bar 85, secured to the rear ends of the rack-bars 80. At desired points the upper cross-bar 79 is provided with one or more carriages or trolleys 86, which are supported by supporting bars or tracks 87. The trolleys 86 also carry bearings for a shaft 88, which shaft is also journaled in suitable arms 88', secured to the cross-arm 79. Secured to the shaft 88 are gears 89, one for each bobbin-holder 75, and adapted to mesh with a pin or other suitable gear 90, forming part of said bobbin-holder. The bobbin holder or carrier 75 is spool-shaped, and secured to its shank are two radial pins 751 751, which are seated in the bottom of a tangential recess 752. The bobbin 74 is centrally perforated to receive either pin 751 and is surrounded by a clip 741, which is also perforated to receive the pin 751. The outer end of each pin 751 is threaded to receive a nut 753. Between the outer side of clip 741 and bobbin 74 is placed a tension-spring 742, the pressure of which on the bobbin may be regulated by nut 753. Arranged adjacent each bobbin is a wire-guide 754, through which the stay-wire is led and from thence through a hole in the adjacent head of the bobbin-carrier. The stay-wires from the two bobbins are led in opposite directions, so as to issue from opposite ends of the carrier, and in order to economize space the two pins 751 are offset, as shown in Fig. 28.

When the machine is first started, the frame which carries the bobbin-holders will lie to the extreme right, (see Fig. 10,) with the bobbin-holders to the right of the right-hand running-wire. The operator places each stay-wire, which extends from its bobbin through a suitable opening in the adjacent head of the bobbin-holder, between the fingers of a pair of gripping-jaws 91, one pair being provided for each stay-wire. In order to do this, the operator grasps a lever 92, Figs. 3, 7, and 13, which is connected to a shaft 94. The shaft 94 is provided with arms 95, to which are attached links 96, which links are also attached to the gripper-carrying shaft 97, which is carried upon the upper ends of links 98, pivoted to the main frame at 99, which grippers are similar in construction to the grippers shown in detail in Figs. 22 and 23, the particular construction of which will be described later. When the grippers have been thrown down and the ends of the stay-wires placed between the fingers thereof, the operator grasps lever 100, Fig. 3, and through said lever shifts a slide 101, which slide acts through springs 101' to move the movable members of the gripping-jaws, and thus hold the ends of the stay-wires. Thereupon the operator steps upon a lever 102, which through chain 103 operates upon a pawl-lever 104, pivoted upon shaft 82. This pawl-lever carries a pair of integral or connected pawls 105 and 106, which are adapted to engage, respectively, a pair of oppositely-arranged ratchet-wheels 107 and 108, secured to shaft 82. Previous to this the operator has shifted a bar 109 to the right, Fig. 12, so as to put a spring 110 under tension and throw pawl 105 into operative engagement with its ratchet 107, and by repeatedly reciprocating the foot-lever 102 the bobbin-carrying frame is moved to the left, Figs. 10 and 11, until one of the slots 76 receives the first running-wire, the foot-lever being automatically retrieved by a suitable spring 111. Thereupon the operator grasps lever 112, Figs. 4 and 18, and shifts the clutches 113 and 114 upon shaft 88. These clutches are adapted to engage with bevel-gears 115 and 116, respectively, which are sleeved upon shaft 88 and which are continuously driven by means of a gear 117, attached to one end of a square shaft 118, said shaft passing through a suitable driving-gear 119, Fig. 4. This results in a rotation of the gears 89, and consequently rotation of the bobbin-holder 75, so that the bobbins are carried around the running-wires, and thus wrap the stay-wires about said running-wire, as clearly shown in Figs. 27 and 28. When a sufficient number of turns has been made, the rotation of shaft 118 is stopped by any suitable clutch mechanism, (not shown,) the slot 76, in which the running-wire lies, being stopped so as to point to the right. Thereupon the operator again operates foot-lever 102 so as to again advance the bobbin-frame until the next running-wire is received by the bobbins. The bobbin-frame is preferably provided with a depending finger 120, which is adapted to enter any one of a series of notches 121, Fig. 10, formed in the upper edge of a bar 122, pivoted at its rear end and at its forward end carried by a link 123, attached to a suitable hand-lever 124, thus insuring the proper position of the bobbins for each running-wire. Owing to the fact that the slots 76 do not extend clear to the center of the bobbin-holders there is a consequent lateral vibration of the fabric, and in order to compensate this the gripper-shaft 97 is normally urged to the right, Figs. 10 and 11, by suitable springs 125.

The operation just described is repeated for each running-wire, and when the stay-wires have been wrapped about the last running-wire the bobbin-holders are again slightly moved to the left by foot-lever 102. Thereupon the operator grasps lever 126, Figs. 13 and 3. This lever is secured to shaft 127, provided with a plurality of arms 128, which are connected to arms 129, carried by a gripper-shaft 130, which corresponds to the gripper-shaft 97 at the opposite side of the machine. This gripper-shaft 130 is carried at the opposite ends of links 131, so that when lever 126 is swung upward, Fig. 10, the gripper is moved upward and to the right. The grippers consist of a series of gripper-heads 132, each of which carries a stationary gripper-finger 132'. Pivoted to this finger 132' is a movable gripper-finger 133, which is connected, through a spring 134, with a slide 135. Head 132 is transversely slidable upon the shaft 130, and each is provided with a spring 136, which acts in opposition to the springs 125. Slide 135 is connected to a suitable hand-lever 137, which as soon as the gripper-jaws 132' 133 are thrown down into engagement with the stay-wires is operated so as to put the springs 134 under tension, and thus grip the stay-wires, lever 137 being held in position by means of a small pawl 138, Fig. 23.

As soon as the ends of the stay-wires have been firmly secured by the grippers 132' 133 the operator throws two sets of shears 154 and 155 upward into engagement with the stay-wires between the top and bottom running-wires and their adjacent stay-wire grippers. The non-swinging jaws of the shears 154 are connected by a cross-bar 156, and the same jaws of the shears 155 are connected by cross-bar 157. These bars are then connected by links 158 and 159, respectvely, with a pair of swinging levers 160 and 161, respectively, by means of which the shears may be simultaneously raised and lowered. These levers 160 and 161 are connected by suitable links 162 and 163, respectively, with a pair of parallel shafts 164 and 165, respectively, which shafts are connected by arms 166 and 167, respectively, with a counterweighted hand-lever 168. As soon as the shears are raised to operative position the operator steps upon a lever 169, Figs. 6 and 7, which is connected by a suitable link and lever 170 and 171 to a shaft 172. Shaft 172 is provided with a pair of oppositely-extending arms 173 and 174, which are connected by links 175 and 176, respectively, to bars 177 and 178, which bars are attached, respectively, to the movable jaws of the shears 154 and 155, the movement of lever 169 thus resulting in an operation of the shears and a clipping of the stay-wires. The foot-lever 169 is automatically returned to normal position, so as to open the jaws of the shears by means of a spring 179, Fig. 9, which is connected by an arm 180 and link 181 with shaft 172. When the operative shaft 88 has been shifted to the point nearest the grippers 132' and 133, a pin 182, Fig. 18, is engaged by a shifting pawl 183, so as to shift the clutches 113 and 114 and reverse the direction of rotation of shaft 88. At the opposite end of the stroke a return shifting of the clutches is accomplished by a similar shift-stop 184, which engages a similar pin 185. When one set of stay-wires has been attached and severed, as described, the operator steps upon foot-lever 144, which is connected to shaft 127 by a link 145. This throws grippers 132′ 133 upward and outward, so as take up the slack in the stay-wires between the grippers and bobbins. The grippers are held in this position by an arm 139, carried by shaft 127, engaged by a stop-lever 140, Figs. 9 and 11, which was withdrawn by a hand-lever 141, Fig. 3, connected to lever 140 by links 142 and 143. The shaft 94 is similarly provided with an arm 146, adapted to engage a stop-lever 147, similar to lever 140, Fig. 11. Lever 147 may be operated by link 150, shaft 149 and hand-lever 148, Figs. 3 and 7, operated by link 150, shaft 149, and hand-lever 148, Figs. 3 and 7. Shaft 94 is also connected by links 151 and lever 152 with a foot-lever 153, similar to lever 144, so that the operation upon the grippers carried by shaft 94 when the fabric is completed by the return movement of the bobbin carrier-frame is the same as upon the grippers 132′ 133 just described. The operator then steps upon lever 50, and thus draws carriages 43 to the left, so as to release the tension upon the running-wires, so as to bring pawls 54 into engagement with pins 55, and thus release the running-wires. Thereupon the operator turns drum 53 by means of crank 186, the running-wire gripper moving forward with the completed fabric. When the completed fabric has been entirely withdrawn from under the stay-wire-attaching mechanism, another running-wire gripper may be attached or the same one removed and reattached in the manner already described, and the bobbin-holder frame is started upon its return journey, the operation being repeated, as already described. In order to do this, the operator shifts bar 109, so as to withdraw the tension upon spring 110 and put into tension a spring 187, which is attached to the pawl 106. Thereupon the operator instead of operating foot-lever 102 in order to move the bobbin-carrier frame operates a similar lever 188, which is connected by a link 189 and a lever 190 to a chain 191, which extends from lever 104 in a direction opposite to that of chain 103.

I claim as my invention—

1. In a wire-fence machine, the combination, with the main frame and means for supporting a plurality of running-wires, of a stay-wire-bobbin carrier, means for moving said carrier step by step transversely of the running-wires, a plurality of stay-wire bobbins, means carried by the carrier for supporting said stay-wire bobbins, means for simultaneously revolving the bobbins about any running-wire, and means for severing the stay-wires from the bobbins.

2. In a wire-fence machine, the combination, with the main frame and means for supporting a plurality of running-wires, of a stay-wire-bobbin carrier, means for revolving the bobbin about any running-wire, means for carrying said carrier from one running-wire to another, a pair of stay-wire grippers adapted to receive and retain the ends of the stay-wire, and means for cutting the stay-wire from its bobbin.

3. In a wire-fence machine, the combination, with the main frame and means for supporting a plurality of running-wires, of a stay-wire-bobbin carrier, means for revolving the bobbin about any running-wire, means for moving said bobbin-carrier from one running-wire to another, a stay-wire gripper adapted to receive and retain the initial end of the stay-wire, and a yielding support for said gripper yielding transversely of the running-wires.

4. In a wire-fence machine, the combination, with the main frame and means for supporting a plurality of running-wires, of a stay-wire-bobbin carrier, means for revolving the bobbin about any running-wire, means for moving said carrier from one running-wire to another, a stay-wire gripper adapted to retain the initial end of a stay-wire, a yielding support for said gripper yielding transversely of the running-wires, and means for severing the stay-wire from its bobbin.

5. In a wire-fence machine, the combination, with the main frame and means for supporting a plurality of running-wires, of a stay-wire-bobbin carrier, means for revolving the bobbin about any one of the running-wires, means for moving said bobbin-carrier from one running-wire to the other in either direction, a pair of stay-wire grippers arranged upon opposite sides of the series of running-wires and adapted to receive the stay-wire, and a yielding support for each of said grippers yielding transversely of the running-wires.

6. In a wire-fence machine, the combination, with the main frame and means for supporting a plurality of running-wires, of a stay-wire-bobbin carrier, means for revolving the bobbin about any one of the running-wires, means for moving said bobbin-carrier from one running-wire to the other in either direction, a pair of stay-wire grippers arranged upon opposite sides of the series of running-wires and adapted to receive the stay-wires, a yielding support for each of said grippers yielding transversely of the running-wires, and means for severing the stay-wire between each stay-wire gripper and the adjacent running-wire.

7. In a wire-fence machine, an oscillatory gripper-carrying bar, a stay-wire gripper carried thereby and transversely yieldable thereon, means for oscillating said bar to throw the gripper into and out of operative position, and a catch arranged to retain said bar with the grippers under tension.

8. In a wire-fence machine, a gripper-carrying bar 97, a stay-wire gripper carried thereby, a rock-shaft 94, connections between said rock-shaft and the gripper-carrying bar to move said bar in the line of the stay-wire, an arm carried by said rock-shaft, a catch adapted to engage said arm in opposition to the tension of the stay-wire, and means for controlling the position of said catch.

9. In a wire-fence machine, the combination, with the main frame and means for supporting a plurality of running-wires, of a bobbin-carrier frame movable transversely of the running-wires, a stay-wire bobbin journaled on said frame, and means for moving said frame transversely of the running-wires in either direction, said means consisting in part of a shaft 82, a pair of oppositely-arranged ratchets carried by said shaft, a pawl-lever, a double-ended pawl carried by said lever and adapted to engage said ratchets, a pair of springs acting upon opposite ends of said pawl, a bar to which said springs are attached, and means for holding said bar in either of two positions whereby either spring may be put under tension to swing its corresponding stop into operative position.

10. In a wire-fence machine, the combination, with the main frame and means for supporting a plurality of running-wires, of a stay-wire-bobbin carrier, means for revolving the bobbin about any running-wire, means for moving said carrier from one running-wire to another, a pair of shears arranged at opposite sides of the running-wires in line with the stay-wire, means for projecting said shears into the plane of the running-wires and into engagement with the stay-wire at its opposite ends, and means for operating said shears.

11. In a wire-fence machine, a running-wire gripper consisting of three transversely-slotted bars the slots of which are adapted to receive the running-wires, a toggle 60 connected at one end to two of said bars and at the other end to the other bar, and a lever arranged to operate upon said toggle whereby one bar is shifted with relation to the other two and a kink thereby formed in the running-wires, for the purpose set forth.

12. In a wire-fence machine, a running-wire gripper consisting of three transversely-slotted bars the slots of which are adapted to receive the running-wires, a toggle 60 connected at one end to two of said bars and at the other end to the other bar, a lever arranged to operate upon said toggle whereby one bar is shifted with relation to the other two and a kink thereby formed in the running-wires, and means for limiting the throw of said lever, for the purpose set forth.

13. In a wire-fence machine, the combination, with the main frame and means for supporting a plurality of running-wires, of a running-wire gripper consisting of three transversely-slotted bars adapted to receive the running-wires, means for shifting one of said bars with relation to the other two whereby a kink is formed in the running-wires, a pair of feed-chains carried by the main frame, a pair of fastening-bolts carried by the running-wire gripper and provided with means for engaging the chains, and means for operating said bolts, for the purpose set forth.

14. In a wire-fence machine, the combination, with the main frame and means for supporting a plurality of running-wires, of a running-wire gripper consisting of three transversely-slotted bars adapted to receive the running-wires, a pair of feed-chains carried by the main frame, a pair of fastening-bolts carried by the running-wire gripper and provided with means for engaging the chains, and means for simultaneously shifting the movable bar and operating the chain-engaging bolts, for the purpose set forth.

15. In a wire-fence machine, the combination, with the main frame and means for supporting a plurality of running-wires, of a series of tension-slides, one for each wire, a pawl carried by each slide and arranged to grip one of the wires, and means for moving each slide in either direction longitudinally of the running-wires.

16. In a wire-fence machine, the combination, with the main frame and means for supporting a plurality of running-wires, of a series of tension-slides, one for each wire, a pawl carried by each slide and arranged to grip one of the wires, means for moving each slide in either direction longitudinally of the running-wires, and means for engaging each pawl to automatically retract it from the adjacent wire at the end of the movement of its slide in one direction.

17. In a wire-fence machine, the combination, with the main frame and means for supporting a plurality of running-wires, of a bobbin-carrier frame, a bobbin-carrier rotatably mounted therein, a pair of pins 751 carried thereby, a pair of bobbins rotatably mounted on said pins, clips 741 embracing said bobbins, tension-springs engaging said bobbins, and means for retaining the bobbins on the pins and for regulating the tension of said springs.

In witness whereof I have hereunto set my hand and seal, at Indianapolis, Indiana, this 20th day of January, A. D. 1904.

CHARLES S. HENSLEY. [L. S.]

Witnesses:
ARTHUR M. HOOD,
JAMES A. WALSH.